US012784950B2

(12) United States Patent
Arai

(10) Patent No.: US 12,784,950 B2
(45) Date of Patent: Nov. 3, 2026

(54) MAGNETIC BEAD, MAGNETIC BEAD DISPERSION LIQUID, AND METHOD OF MANUFACTURING SAME

(71) Applicant: SEIKO EPSON CORPORATION, Tokyo (JP)

(72) Inventor: Akira Arai, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 469 days.

(21) Appl. No.: 18/494,821

(22) Filed: Oct. 26, 2023

(65) Prior Publication Data

US 2024/0145138 A1 May 2, 2024

(30) Foreign Application Priority Data

Oct. 26, 2022 (JP) ................................ 2022-171238

(51) Int. Cl.

*H01F 1/147* (2006.01)
*B22F 1/142* (2022.01)
*B22F 1/16* (2022.01)

(52) U.S. Cl.

CPC .......... *H01F 1/14766* (2013.01); *B22F 1/142* (2022.01); *B22F 1/16* (2022.01); *B22F 2301/35* (2013.01); *B22F 2302/256* (2013.01); *B22F 2304/10* (2013.01)

(58) Field of Classification Search

CPC ........ B22F 1/142; B22F 1/16; B22F 2301/35; B22F 2302/256; B22F 2304/10; B22F 2999/00; B22F 1/05; B22F 9/082; C22C 33/02; G01N 1/40; G01N 33/53; G01N 33/54326; H01F 1/14766; H01F 1/28; H01F 1/33

See application file for complete search history.

(56) References Cited

U.S. PATENT DOCUMENTS

| | | | | |
|---|---|---|---|---|
| 12,260,976 | B2 * | 3/2025 | Ikeda | B22F 1/052 |
| 2017/0283791 | A1 | 10/2017 | Fukushima et al. | |
| 2023/0260683 | A1 * | 8/2023 | Arai | B22F 1/10<br>252/62.55 |
| 2023/0307161 | A1 * | 9/2023 | Nakamori | H01F 1/14766 |
| 2023/0317331 | A1 * | 10/2023 | Ichikawa | B22F 9/082<br>148/105 |

FOREIGN PATENT DOCUMENTS

| | | | |
|---|---|---|---|
| JP | 2017176023 | A | 10/2017 |
| JP | 2022154413 | A * | 10/2022 |

OTHER PUBLICATIONS

Office Action for JP Patent Application No. 2022171238, issued on May 26, 2026, 8 pages.

* cited by examiner

*Primary Examiner* — Anthony J Green
(74) *Attorney, Agent, or Firm* — CHIP LAW GROUP

(57) ABSTRACT

There is provided a magnetic bead that includes a magnetic metal powder and a coating layer with which a surface of the magnetic metal powder is coated. D50, which is a 50% particle diameter on a volume basis in a particle size distribution, is 0.5 μm to 10 μm, a density is 5.0 g/cc to 7.5 g/cc, and a coercive force is 800 A/m or less.

7 Claims, 2 Drawing Sheets

MAGNETIC BEAD, MAGNETIC BEAD DISPERSION LIQUID, AND METHOD OF MANUFACTURING SAME

The present application is based on, and claims priority from JP Application Serial Number 2022-171238, filed Oct. 26, 2022, the disclosure of which is hereby incorporated by reference herein in its entirety.

BACKGROUND

1. Technical Field

The present disclosure relates to a magnetic bead, a magnetic bead dispersion liquid, and a method of manufacturing the same.

2. Related Art

In recent years, in fields of diagnosis in a medical field and life science, there has been an increasing demand for testing so-called biological substances such as nucleic acids, proteins, cells, bacteria, and viruses. In the process of testing such a biological substance, it is necessary to first extract a test target substance from a specimen. In the process of extracting the biological substance, a magnetic separation method using magnetic beads is widely used. The magnetic separation method is a method of extracting a biological substance by applying a magnetic field using magnetic beads having a function of carrying the biological substance which is an extraction target.

Among biological substance test methods, a polymerase chain reaction (PCR) method is a method of extracting a nucleic acid (DNA, RNA, or the like) and specifically amplifying and detecting the nucleic acid. In order to efficiently extract a nucleic acid which is the test target, in the recent PCR method, the magnetic separation method using magnetic beads having a function of carrying the nucleic acid is used. Specifically, magnetic beads, which have a function of carrying a test target substance on surfaces thereof, are loaded into a dispersion liquid, the dispersion liquid is loaded in a magnetic field generator such as a magnetic stand, and ON/OFF of magnetic field application is repeated a plurality of times to extract the target substance such as a nucleic acid. Since such a magnetic separation method is a method of separating and recovering beads by a magnetic force, a rapid separation operation can be performed.

In addition, the same magnetic separation method is used not only in the extraction performed in the PCR method but also in fields of protein purification, exosome and cell separation and extraction, or the like.

Various studies have been made on the magnetic beads used in the magnetic separation method employed in the test and extraction of such a biological substance.

For example, JP-A-2017-176023 discloses a nucleic acid-binding solid-phase carrier in which a silicon oxide film is formed on magnetic particles of an amorphous metal.

Along with an increasing demand for PCR tests or the like recently, in diagnosis and various tests in the medical field, improvement of an extraction efficiency of the test target substance and improvement of a test accuracy are required.

However, the magnetic beads described in JP-A-2017-176023 have the following problems.

That is, in a step of extracting the biological substance which is the test target, aggregation or settling of the magnetic beads occurs to cause a decrease in extraction efficiency of the target biological substance. As a result, a situation occurs in which a sufficient extraction amount of the biological substance cannot be secured.

In some cases, reliability in test cannot be secured due to mixing of impurities (contamination).

These problems will be described in more detail below.

A series of steps of extracting a test target substance such as a nucleic acid includes a dissolution and extraction step, a magnetic separation step, a washing step, and an elution step. Among these, the dissolution and extraction step, which is a step of adsorbing a target substance on surfaces of magnetic beads, is the most important step from the viewpoint of an extraction efficiency and an extraction amount of a biological substance.

In the dissolution and extraction step, the magnetic beads are present in a dispersed state in a dissolution and extraction liquid, and extraction can be performed by adsorbing the biological substance, which is the test target such as a nucleic acid, on the surfaces of the magnetic beads present in the dispersed state. In other words, in the dissolution and extraction step, it is important how to efficiently adsorb the biological substance on the surfaces of the beads.

However, the related art has a problem caused by the following situation.

First, the magnetic beads are dispersed in the dissolution and extraction liquid, but when a density and a particle diameter of the magnetic beads are large values exceeding predetermined ranges, the magnetic beads are settled in the dissolution and extraction liquid. Since the biological substance which is the test target is sufficiently small, the biological substance is dispersed in the liquid in a relatively random manner. In contrast, the magnetic beads that have settled cannot capture and adsorb the biological substance dispersed in the liquid, and as a result, the extraction amount is reduced.

In addition, when the particle diameter is extremely small, the magnetic beads are aggregated by an intermolecular force, a Coulomb force, or the like to form a relatively large aggregated particle lump. In this case, settling also occurs to cause the same problem as described above. Further, when a coercive force of the magnetic beads is higher than a predetermined value, the magnetic beads are magnetically coupled to each other due to the magnetization of the magnetic beads. In this case, a large aggregated particle lump is also formed, and settling occurs to cause the same problem as described above.

Further, when saturation magnetization of the magnetic beads is smaller than a predetermined value, binding of the magnetic beads by a magnetic field in the magnetic separation step becomes weak, and in particular, the magnetic beads themselves become impurities (contamination) due to floating of the magnetic beads having a small particle diameter in the liquid, and there is a problem that the test accuracy decreases.

SUMMARY

In order to solve the above problem, a magnetic bead according to an application example of the present disclosure is a magnetic bead including a magnetic metal powder and a coating layer with which a surface of the magnetic metal powder is coated, in which D50, which is a 50% particle diameter on a volume basis in a particle size distribution, is 0.5 μm to 10 μm, a density is 5.0 g/cc to 7.5 g/cc, and a coercive force is 800 A/m or less.

According to the magnetic bead of the present disclosure, it is possible to prevent settling in a dissolution and extraction step. As a result, it is possible to prevent a decrease in extraction efficiency of a biological substance which is a test target, and to obtain a sufficient extraction amount.

In addition, in the magnetic bead according to the present disclosure, the magnetic metal powder is an alloy containing Fe as a main component.

Further, saturation magnetization is 50 emu/g or more.

According to the magnetic bead of the present disclosure, binding of the magnetic beads by a magnetic field in a magnetic separation step is secured, and generation of impurities (contamination) due to floating of the magnetic beads themselves in a liquid is prevented. As a result, a test accuracy can be improved.

Further, in the magnetic bead according to the present disclosure, the magnetic metal powder is an Fe-based metal alloy powder produced by an atomization method.

In addition, the coating layer is made of a silicon oxide (silica), or a composite oxide containing Si and one or two or more selected from the group consisting of Al, Ti, V, Nb, Cr, Mn, Sn, and Zr.

A magnetic bead dispersion liquid according to an application example of the present disclosure contains: a magnetic bead made of a magnetic metal powder having a coating layer on a surface thereof; and a dispersion medium which is an aqueous solution or an organic solvent containing the magnetic bead, in which D50, which is a 50% particle diameter on a volume basis in a particle size distribution of the magnetic bead, is 0.5 μm to 10 μm, a density of the magnetic bead is 5.0 g/cc to 7.5 g/cc, and a coercive force of the magnetic bead is 800 A/m or less.

A method of manufacturing a magnetic bead according to an application example of the present disclosure includes: a magnetic metal powder manufacturing step of manufacturing a magnetic metal powder; a coating step of forming a coating layer on a surface of the magnetic metal powder; a classifying step of classifying the magnetic metal powder or the magnetic metal powder on which the coating layer is formed, the classifying step being performed before or after the coating step; and a heat treatment step of performing a heat treatment on the magnetic metal powder, the heat treatment step being performed after the coating step, in which in the coating step, the coating layer is formed such that a thickness of the coating layer is 3 nm to 50 nm, and in the classifying step, the classification is performed such that D50, which is a 50% particle diameter on a volume basis in a particle size distribution of the magnetic bead, is 0.5 μm to 10 μm.

A method of manufacturing a magnetic bead dispersion liquid according to an application example of the present disclosure includes: manufacturing a magnetic bead by manufacturing a magnetic metal powder and forming a coating layer on the magnetic metal powder, the magnetic bead having a 50% particle diameter on a volume basis in a particle size distribution of 0.5 μm to 10 μm, a density of 5.0 g/cc to 7.5 g/cc, and a coercive force of 800 A/m or less; and mixing and dispersing the magnetic bead in a dispersion medium which is an aqueous solution or an organic solvent.

DESCRIPTION OF EMBODIMENTS

Hereinafter, a magnetic bead and a method of manufacturing the same according to an embodiment of the present disclosure will be described.

1. Magnetic Bead

The magnetic bead in the present disclosure is used in the process of extracting a biological substance, that is, a nucleic acid such as DNA and RNA, a cell, a bacterium, a virus, or the like utilizing a separation process using magnetism, and is a particle group capable of adsorbing the biological substance. The structure is a magnetic bead in a powder form including a "magnetic metal powder" as a core and a "coating layer" with which a surface of the magnetic metal powder is coated.

Figure 1:
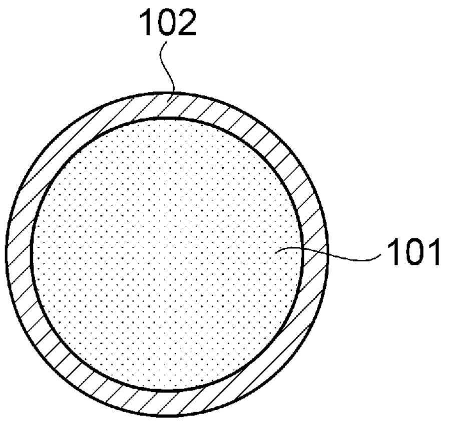
FIG. 1 is a schematic diagram showing a structure of a magnetic bead according to an embodiment.

FIG. 1 shows a schematic diagram of a magnetic metal powder 101 and a coating layer 102 related to one particle of the magnetic bead. The magnetic bead in the present disclosure refers to such one particle or an aggregate of these particles.

The magnetic bead has D50, which is a 50% particle diameter (median diameter) on a volume basis in a particle size distribution of the magnetic bead, preferably in a range 0.5 μm to 10 μm. The D50 is more preferably 1 μm to 5 μm. When the D50 is less than 0.5 μm, a value of the magnetization per particle of the magnetic bead becomes small, the aggregation of the beads is remarkable, and settling occurs in a liquid in a dissolution and extraction step described in detail later. As a result, an extraction efficiency of the biological substance decreases. Therefore, the D50 of the magnetic bead is 0.5 μm or more. For the same reason, the D50 is more preferably 1 μm or more, and the extraction efficiency can be increased.

On the other hand, when the D50 of the magnetic bead exceeds 10 μm and the magnetic bead becomes coarse, a weight per particle of the magnetic bead becomes large, and in this case, settling also occurs in a dissolution and extraction liquid. As a result, the extraction efficiency of the biological substance decreases, and it is difficult to obtain a sufficient extraction amount. Therefore, the D50 of the magnetic bead is preferably 10 μm or less, and more preferably 5 μm or less.

The D50 of the magnetic bead can be obtained by, for example, measuring a particle size distribution on a volume basis by a laser diffraction and dispersion method and obtaining a cumulative distribution curve from the particle size distribution. Specifically, in the cumulative distribution curve, a particle diameter at a cumulative value of 50% from a small diameter side is the D50 (median diameter). Examples of a device for measuring the particle diameter by the laser diffraction and dispersion method include MT3300 series manufactured by MicrotracBEL Corporation. The measurement can be performed not only by the laser diffraction and dispersion method but also by a method such as image analysis. D90 described later can also be measured by the same method.

The magnetic bead according to the present disclosure preferably has a density of 5.0 g/cc to 7.5 g/cc. When the density exceeds 7.5 g/cc, the weight per magnetic bead particle becomes heavy, and thus settling of the bead occurs in the liquid in a dissolution and adsorption step. As a result, the extraction amount of the biological substance such as a nucleic acid which is a test target cannot be sufficiently secured. On the other hand, when the density is less than 5.0 g/cc, a content of a magnetic element (mainly Fe) in the magnetic metal powder is insufficient or a ratio of the coating layer to the magnetic metal powder in the configuration of the magnetic bead is large. In either case, a sufficient value cannot be obtained for saturation magnetization of the magnetic bead. Therefore, a binding force of the magnetic beads due to a magnetic field in a magnetic separation step becomes weak. As a result, the magnetic bead floating in the liquid becomes impurities (contamination), which causes a decrease in test accuracy.

The density of the magnetic bead defined in the present disclosure refers to a so-called true density, and can be measured by a pycnometry. The pycnometry generally includes a wet method using water and a dry method using gas, and either method may be used. Since the magnetic bead according to the present disclosure is a fine powder, the dry method is preferably employed. The dry pycnometry measures the true density by a so-called constant volume expansion method, and the measurement method is defined in JIS-R-1620 or the like. Examples of a measurement device for measuring the density by the dry pycnometry include AccuPyc 1330 manufactured by Micromeritics Corporation.

Further, a coercive force Hc of the magnetic bead according to the present disclosure is preferably 800 A/m or less. The "coercive force Hc" refers to a value of an external magnetic field in an opposite direction required to return a magnetized magnetic body to an unmagnetized state. That is, the coercive force Hc means a resistance to the external magnetic field. As the coercive force Hc of the magnetic beads reduces, the magnetic beads are less likely to aggregate even when the magnetic field application is switched from a state in which the magnetic field is applied to a state in which the magnetic field is not applied, and the magnetic beads can be uniformly dispersed in the dispersion liquid. Further, even when the switching of the magnetic field application is repeated, the smaller the coercive force Hc, the more excellent the redispersibility of the magnetic beads, and therefore, the aggregation of the magnetic beads can be further prevented. In order to obtain such an effect, the coercive force Hc of the magnetic bead is preferably 800 A/m or less, and more preferably 200 A/m or less. A lower limit of the coercive force Hc of the magnetic metal powder is not particularly limited, and may be 5 A/m from the viewpoint of the ease of selection of materials suitable for the balance between the performance and the cost.

Saturation magnetization of the magnetic beads in the embodiment is preferably 50 emu/g or more, and more preferably 100 emu/g or more. The "saturation magnetization" is a value of magnetization exhibited by a magnetic material when a sufficiently large magnetic field is applied from the outside. The larger the saturation magnetization of the magnetic beads, the more sufficiently the function as the magnetic material can be exhibited. Specifically, since a moving speed (recovery speed) after extraction in the magnetic field can be improved, a test time can be shortened. In order to obtain such an effect, the saturation magnetization of the magnetic beads is preferably 50 emu/g or more, and more preferably 100 emu/g or more. An upper limit of the saturation magnetization of the magnetic beads is not particularly limited, and may be 220 emu/g from the viewpoint of the ease of selection of materials suitable for the balance between the performance and the cost.

The coercive force and the saturation magnetization of the magnetic bead can be measured by a vibrating sample magnetometer (VSM) or the like. As the vibrating sample magnetometer, for example, "TM-VSM1230-MHHL" manufactured by Tamakawa Co., Ltd., or the like can be used for the measurement. A maximum applied magnetic field during the measurement of the saturation magnetization is measured by applying a magnetic field of, for example, 0.5 T or more. A relative permeability described later can also be measured by the same vibrating sample magnetometer.

In addition, a ratio of an average thickness (t) of the coating layer to the D50 of the magnetic bead in the particle size distribution, that is, t/D50, is preferably 0.0001 to 0.05. When the t/D50 is less than 0.0001, a ratio of the thickness of the coating layer to a size of the magnetic metal powder is too small, and when the magnetic beads collide with each other or the magnetic beads collide with a wall surface of a container, the coating layer is destroyed or peeled off. Therefore, an extraction amount of a biological substance, which is a test target, adsorbed and extracted to the surface of the coating layer, cannot be sufficiently obtained, and the extraction efficiency decreases. In addition, pieces of the peeled coating layer and magnetic metal powder are present in a dispersion liquid, and are mixed as impurities (contamination) when the biological substance which is the extraction target is taken out, which causes the test accuracy to decrease. Further, when the coating layer is destroyed and peeled off, the magnetic metal powder as a base material is exposed, and elution of iron ions or the like occurs in an acidic solution or the like. As a result, the extraction efficiency decreases.

On the other hand, when the t/D50 exceeds 0.05, a volume ratio of the coating layer to the entire volume of the magnetic bead increases, and the magnetization per volume of the magnetic bead decreases. Such a decrease in magnetization results in a decrease in moving speed of the magnetic bead in the magnetic field in a magnetic separation step, which increases a time required for a test step, and leads to a decrease in test efficiency.

In addition, a Vickers hardness of the magnetic metal powder constituting the magnetic bead according to the present disclosure is preferably 100 or more. When the Vickers hardness is less than 100, the magnetic metal powder is plastically deformed due to an impact when the magnetic beads collide with each other. When plastic deformation occurs, the coating layer has a deformability smaller than that of the magnetic metal powder. As a result, peeling or falling of the coating layer occurs, which leads to a decrease in extraction efficiency of the biological substance and a decrease in test accuracy similar to those described above. For the same reason, the Vickers hardness is more preferably 300 or more, and still more preferably 800 or more. On the other hand, an upper limit of the Vickers hardness is not particularly limited, and may be 3000 from the viewpoint of the ease of selection of materials suitable for the balance between the performance and the cost.

In addition, in the magnetic bead according to the present disclosure, a value of D90/D50, which is a ratio of the D90 (90% particle diameter on a volume basis) to the D50, is preferably 3.00 or less. When the D90/D50 is larger than 3.00, a particle size distribution in which a large amount of coarse particles are present is obtained. Since coarse magnetic bead particles have high magnetism in a magnetic field, when a large amount of coarse magnetic bead particles are mixed, the coarse magnetic bead particles aggregate while attracting relatively small particles around the coarse magnetic bead particles, and even when the magnetic field is turned off, the dispersibility is impaired and remarkable aggregation is caused. Further, when the magnetic bead particles aggregate with each other, the magnetic bead particles settle on a bottom portion of a dispersion liquid due to the own weight thereof, which may lead to a decrease in extraction efficiency and an increase in test time. Therefore, the D90/D50 is 3.00 or less, more preferably 2.00 or less, and still more preferably 1.75 or less.

A shape of the magnetic bead in the embodiment is not particularly limited, and may be a circular, elliptical, or polygonal cross-sectional shape. From the viewpoint of preventing the aggregation of the magnetic beads and improving the mobility, a ratio of bead particles having a circularity of 0.60 or less in the magnetic beads is preferably 3% or less. When particles having a circularity of 0.60 or less are present in an amount of more than 3%, in the magnetized particles, due to the shape magnetic anisotropy, a density of magnetic field lines formed by the particles is not uniform. As a result, the aggregation of the magnetic beads is remarkable. Further, since such aggregation occurs, the mobility of the magnetic beads decreases.

The circularity is defined by the following formula.

$$\text{Circularity}=4\pi S/L^2 (\text{* denominator is square of } L)$$

Here, S represents a projected area of a particle, and L represents a perimeter of a particle.

The circularity of the magnetic bead particle can be measured by image processing. An area and a perimeter of each powder particle can be calculated by performing the image processing using an image including a plurality of powder particles captured by a scanning microscope (SEM), an optical microscope, or the like. Further, an abundance ratio of powder particles each having a specific circularity among the plurality of powder particles can also be calculated. Specifically, for example, the projected area, the perimeter, and the abundance ratio can be measured by using Image-J, which is a free image processing system developed by National Institutes of Health of USA.

The magnetic bead has a function of carrying a biological substance which is an extraction target on the surface thereof. Therefore, the extraction amount and the extraction efficiency of the biological substance greatly depend on the specific surface area of the magnetic bead. The larger the specific surface area, the larger the amount of the biological substance which is the extraction target and can be carried on the surface of the magnetic bead, and the extraction efficiency is improved. As a result, it is possible to improve the efficiency and speed of the test. The specific surface area of the magnetic bead is measured by a so-called BET method, and the specific surface area can be measured by a method described in "JISK1150: silica gel test method" or the like. The specific surface area of the magnetic bead is preferably in a range of 0.05 $m^2/g$ to 40 $m^2/g$. When the specific surface area is less than 0.05 $m^2/g$, the amount of the test target substance that can be extracted is reduced, and the test efficiency greatly decreases. On the other hand, when the specific surface area is more than 30 $m^2/g$, impurities other than the target substance to be extracted are easily carried, which leads to a decrease in test accuracy. Further, for this reason, the specific surface area is more preferably in a range of 0.1 $m^2/g$ to 30 $m^2/g$.

The relative permeability of the magnetic bead in the embodiment is desirably 5 or more. The upper limit is preferably as high as possible, and is not particularly limited. Since the magnetic bead is in the form of powder, the relative permeability often takes a value of substantially 100 or less due to an influence of a diamagnetic field. When the relative permeability is less than 5, the moving speed of the magnetic bead associated with the application of the magnetic field decreases, which hinders high-speed processing.

As described above, the magnetic bead in the embodiment has a form in which the magnetic metal powder is used as the core and the coating layer is provided on the magnetic metal powder. Therefore, constituent elements and a composition of the magnetic bead are measured as constituent elements of the magnetic metal powder and the coating layer, which will be described later, and a composition as an abundance ratio of the constituent elements. The measurement of the constituent elements and the composition can be specified by, for example, an ICP emission spectrometry defined in JIS G 1258:2014, a spark emission spectrometry defined in JIS G 1253:2002, or the like. Examples of an analyzer include a solid emission spectrometer (spark emission spectrometer, model: SPECTROLAB, type: LAVMB08A) manufactured by SPECTRO Analytical Instruments GmbH and an ICP device (CIROS120 type) manufactured by Rigaku Corporation. In quantifying a content of C or S, in particular, oxygen gas flow combustion (high-frequency induction furnace combustion), that is, an infrared absorption method defined in JIS G 1211:2018 can be applied. Examples of a carbon content analyzer include a carbon-sulfur analyzer (CS200 type) manufactured by LECO Corporation.

1.1 Magnetic Metal Powder

As shown in FIG. 1, the magnetic bead according to the embodiment includes the magnetic metal powder as the core thereof. The magnetic metal powder is magnetic particles, and preferably contains at least one of Fe, Co, and Ni as the constituent elements. In particular, from the viewpoint of obtaining high saturation magnetization, in the composition of the magnetic metal powder, it is preferable to increase a content of Fe, and it is more preferable to use a composition containing Fe as a main component. Specifically, an atomic ratio of Fe is more preferably 50% or more, and still more preferably 70% or more. In addition, the composition of the magnetic metal powder may be an alloy containing Fe as a main component (Fe-based alloy), and examples thereof include an Fe—Co-based alloy, an Fe—Ni-based alloy, an Fe—Co—Ni-based alloy, and a compound containing Fe, Co, and Ni.

The Fe-based alloy can contain one element or two or more elements selected from the group consisting of Cr, Nb, Cu, Al, Mn, Mo, Si, Sn, B, C, P, Ti, and Zr depending on intended characteristics, in addition to elements exhibiting ferromagnetism alone such as Co and Ni as described above. From the viewpoint of obtaining high magnetization, an Fe—Si-based alloy powder, an Fe—Si—Cr-based alloy powder, an Fe—Si—B—Cr-based alloy powder, or the like is preferable as the magnetic metal powder. Si is a main constituent element in the alloy powder, and has an effect of promoting amorphization. The Fe-based alloy may contain inevitable impurities as long as the effects of the present disclosure are not impaired.

The inevitable elements in the embodiment are elements (impurities) that are unintentionally mixed in a material of the magnetic metal powder or during manufacturing of the magnetic bead. The inevitable elements are not particularly limited, and examples thereof include O, N, S, Na, Mg, and K.

The constituent elements and the composition of the magnetic metal powder can be specified by the ICP emission spectrometry defined in JIS G 1258:2014, the spark emission spectrometry defined in JIS G 1253:2002, or the like, similar to that of the magnetic bead described above. The constituent elements and the composition of the magnetic metal powder can be measured by the above methods for both the magnetic metal powder in a state before the coating layer is formed, and the magnetic powder in a state in which the coating layer is removed from the magnetic bead by a chemical or physical method. In addition, when it is difficult to remove the coating layer from the magnetic bead, it is possible to, for example, cut a bead cross section and analyze a portion of the magnetic metal powder that is the core by an analyzer such as EPMA or EDX. In this case, the measurement can also be performed by embedding the magnetic metal powder in a resin and analyzing a cut surface.

A metal structure constituting the magnetic metal powder can take various forms such as a crystal structure, an amorphous structure, and a nanocrystal structure. Here, the amorphous structure refers to an amorphous structure in which no crystal is present. The nanocrystal refers to a structure in which a fine crystal having a crystal particle diameter of about 100 nm is present. Among these, the amorphous structure or the nanocrystal structure is particularly preferable in the embodiment. That is, a high hardness is easily obtained by forming the magnetic metal powder in the amorphous structure or the nanocrystal structure. In addition, when the amorphous structure or the nanocrystal structure is used, the coercive force Hc is a low value, and the effect of contributing to the improvement of the dispersibility of the magnetic bead is also obtained as described above. The metal structure of the magnetic metal powder can be any structure when the crystal structure, the amorphous structure, and the nanocrystal structure described above is present alone or when any one of these structures is present in a mixed manner.

The metal structure of the magnetic metal powder can be identified by an X-ray diffraction method with respect to the magnetic metal powder before the magnetic bead or the coating layer is formed. Further, the metal structure can be specified by analyzing a structure observation image or a diffraction pattern of the cut-out sample by a TEM. More specifically, in the case of the amorphous structure, for example, a diffraction peak derived from a metal crystal such as an αFe phase is not observed in peak analysis in the X-ray diffraction method. In addition, a so-called halo pattern is formed in an electron beam diffraction pattern obtained by the TEM, and formation of a spot by a crystal is not observed. The nanocrystal structure is composed of a crystal structure having a particle diameter of about 100 nm or less, and can be confirmed from a TEM observation image. More precisely, an average particle diameter can be calculated by image processing or the like based on a plurality of TEM structure observation images in which a plurality of crystals are present. In addition, the crystal particle diameter can be estimated by a Sherer method based on the diffraction peak of the crystal phase to be analyzed by the X-ray diffraction method. Further, for a crystal structure having a large particle diameter, the crystal particle diameter or the like can be observed and measured by a method such as observation of a cross section using an optical microscope or SEM.

In order to obtain the amorphous structure and the nanocrystal structure, it is effective to increase a cooling rate during solidification in the manufacturing of the magnetic metal powder. In addition, ease of formation of the amorphous structure and the nanocrystal structure also depends on the alloy composition.

As a specific alloy suitable for forming the amorphous structure or the nanocrystal structure, a composition containing Fe and one or two or more selected from the group consisting of Cr, Si, B, C, P, Nb, and Cu is preferable.

In the case of the nanocrystal structure or the crystal structure, in the embodiment of the present disclosure, a magnetic phase mainly containing Fe (for example, the αFe phase) is formed, and the crystal particle diameter is preferably 1 nm to 3 μm.

A powder particle diameter, a particle size distribution, and a circularity of the magnetic metal powder may be selected such that the magnetic bead has the various characteristics described above when the coating layer is applied to the surface of the magnetic metal powder to form the magnetic bead. In addition, similarly, magnetic characteristics may be selected such that the magnetic characteristics of the final magnetic bead are the characteristics and in the ranges described above.

Similarly, the specific surface area of the magnetic metal powder may be selected such that the specific surface area of the magnetic bead has the above-described value when the coating layer is applied to form the magnetic bead.

1.2. Coating Layer

The coating layer is formed on the surface of the magnetic metal powder as shown in FIG. 1, and constitutes the magnetic bead. The coating layer can exhibit a function as long as it is formed on at least a part of the surface of the magnetic metal powder, and is preferably formed so as to cover the entire surface.

A main function of the coating layer is to capture a biological substance which is an extraction target on the surface of the coating layer. From this viewpoint, the coating layer preferably has the following substances or chemical structures on the surface.

A first preferred substance constituting the coating layer is an oxide film of a silicon oxide or the like.

The silicon oxide is a substance particularly suitable for extraction of a nucleic acid such as DNA and RNA, and preferably has a composition formula, for example, SiOx ($0<x\leq2$), and specifically, $SiO_2$ is preferable. The silicon oxide enables extraction and recovery of the nucleic acid by specifically adsorbing the nucleic acid in an aqueous solution containing a chaotropic substance. The "chaotropic substance" is a substance that has a function of increasing water solubility of hydrophobic molecules and contributes to nucleic acid adsorption. Specific examples of the chaotropic substance include guanidine hydrochloride, sodium iodide, and sodium perchlorate. In addition, the coating layer may contain a composite oxide or a composite containing silicon and one or two or more selected from the group consisting of Al, Ti, V, Nb, Cr, Mn, Sn, and Zr. Al, Ti, V, Nb, Cr, Mn, Sn, and Zr are elements that prevent ion elution from the magnetic metal powder, which is a coating target, and are excellent in so-called elution resistance. Therefore, by using an oxide, a composite oxide, or a composite of these elements as the coating layer, it is possible to improve an extraction performance of the test target substance while securing the elution resistance. In addition, a plurality of layers of oxides containing different elements or the like may be formed in the coating layer.

A second preferred substance constituting the coating layer is a substance having a functional group, which increases a binding property with the biological substance which is the extraction target, on the surface of the coating layer. Examples of the functional group that increases the binding property include an OH group, a COOH group, an $NH_2$ group, an epoxy group, a trimethylsilyl group, and an NHS group, depending on the target substance.

Examples of other preferred substances constituting the coating layer include proteins such as streptavidin, Protein A, and Protein B, and carbon. In addition, when a nucleic acid is an extraction target, examples of the preferred substances also include a nucleic acid having a property complementary to the nucleic acid which is the target, specifically, an oligo (dT) primer cDNA, or the like.

As described above, the main function of the coating layer is to capture the biological substance which is the extraction target, but it is desirable that the coating layer does not capture substances such as impurities that are not the extraction target. When there is a concern that impurities or the like may be mixed, it is preferable to dispose, on the surface of the coating layer, a substance called a so-called blocking substance and the above-described substance that promotes the capture, although the blocking substance may be unnecessary depending on a state of a specimen before the extraction or the biological substance which is the extraction target. Examples of the blocking substance include polyethylene glycol, albumin, and dextrin.

The coating layer may contain inevitable impurities as long as the effects of the present disclosure are not impaired. For example, when the silicon oxide is used as the coating layer, examples of the inevitable impurities in the silicon oxide include C, N, and P.

The substance and the composition constituting the coating layer can be confirmed by, for example, EDX analysis, Auger electron spectroscopy, or the like. For example, a configuration of the coating layer can be confirmed by measuring a composition distribution in a radial direction of the particle by the EDX analysis on the formed coating layer.

In a depth direction of the magnetic bead, the structure of the coating layer may be any structure including a single layer made of a single substance, a single layer made of a plurality of substances, composites (such as composite oxides), or a mixture, and a plurality of layers made of these substances. In addition, the surface of the coating layer may be made of either the single substance or the plurality of substances.

An average thickness (t) of the coating layer is preferably 3 nm to 100 nm regardless of the above-described structure. When the average thickness of the coating layer is less than 3 nm, portions that cannot be coated on the surface of the magnetic metal powder are generated, and a carried amount of the extraction target substance is reduced. On the other hand, when the average thickness of the coating layer exceeds 100 nm, the extraction performance of the test target substance is saturated, and a film formation time is remarkably increased. Further, the average thickness is more preferably 5 nm to 50 nm for the same reason.

The thickness of the coating layer can be measured based on a cross-sectional observation image of the magnetic bead by a transmission electron microscope (TEM), a scanning electron microscope (SEM), or the like, and an average value of the thickness can be calculated by obtaining a plurality of the observation images and averaging measured values in image processing or the like. In the embodiment, the thickness of the coating layer is measured for 10 or more particles, and the average value thereof is obtained. In addition, the thickness of the coating layer of the particle is measured at five or more positions for one particle, and the average value thereof is obtained.

In addition, in ESCA or the like, the thickness of the coating layer can also be measured by performing composition analysis in the depth direction using ion etching.

Further, depending on the substance constituting the coating layer, it is also possible to measure the thickness of the coating layer by using a so-called calibration curve obtained as a result of comparing a characteristic X-ray intensity ratio of the constituent substance obtained by a scanning electron microscope (SEM-EDX) or a diffraction peak intensity ratio of the constituent substance obtained by the X-ray diffraction method with an actual measurement value obtained by another observation method. For example, when the coating layer made of the silicon oxide is formed on the surface of the magnetic metal powder mainly containing Fe, the thickness can be calculated based on an intensity ratio of diffraction peaks generated due to the magnetic metal powder and the silicon oxide.

2. Magnetic Bead Dispersion Liquid

In a step of extracting a target substance, the magnetic bead is used in a state of being dispersed in a dispersion medium composed of an aqueous solution, an organic solvent, or the like. A liquid in which the magnetic bead is dispersed in the dispersion medium is used as a magnetic bead dispersion liquid in the embodiment of the present disclosure.

Examples of the dispersion medium include polar organic solvents such as water, saline, and alcohols, and aqueous solutions thereof.

Examples of the water include sterilized water and pure water. Examples of the alcohols include ethanol and isopropyl alcohol.

A concentration of the magnetic bead in the magnetic bead dispersion liquid is 30% by weight to 80% by weight. When the concentration is less than 30% by weight, a concentration of a target biological substance (such as a nucleic acid) in a dissolution and adsorption step cannot be sufficiently obtained, which hinders the test. On the other hand, when the concentration exceeds 80% by weight, the amount of the dispersion medium is too small, and it is difficult to secure uniformity.

In addition, a surfactant may be added for the purpose of improving the dispersibility of the magnetic bead in the dispersion liquid. Examples of the surfactant include a nonionic surfactant, a cationic surfactant, an anionic surfactant, and an amphoteric surfactant.

Examples of the nonionic surfactant include a Triton-based surfactant such as Triton (registered trademark)-X and a Tween-based surfactant such as Tween (registered trademark) 20, and acylsorbitan. Examples of the cationic surfactant include dodecyltrimethylammonium bromide, dodecyltrimethylammonium chloride, and cetyltrimethylammonium bromide. Examples of the anionic surfactant include sodium dodecyl sulfate, sodium N-lauroyl sarcosine (SDS), sodium glycolate, sodium lauryl sulfate, and sarcosine. Examples of the amphoteric surfactant include phosphatidylethanolamine. These surfactants may be used alone or in combination of two or more thereof.

A content of the surfactant in a magnetic bead reagent is preferably equal to or larger than a critical micelle concentration of the surfactant. The critical micelle concentration is also referred to as cmc, and refers to a concentration at which molecules of the surfactant dispersed in the liquid aggregate to form a micelle. When the content of the surfactant is equal to or larger than the critical micelle concentration, the surfactant easily forms a layer around the magnetic bead. Accordingly, effects of preventing the aggregation of the magnetic beads can be further improved.

The content of the surfactant is not limited to being equal to or larger than the critical micelle concentration, and may be less than the critical micelle concentration. For example, the content of the surfactant in the magnetic bead reagent is preferably 0.05% by mass or more and 3.0% by mass or less regardless of the critical micelle concentration.

Further, in order to secure long-term preservability and preservative effects of the dispersion liquid, it is preferable to add a preservative. Examples of the preservative include sodium azide. A concentration of the added preservative is preferably 0.02% by weight or more and less than 0.1% by weight. When the concentration is less than 0.02% by weight, the long-term preservability and the sufficient preservative effects cannot be obtained, and when the concentration is 0.1% by weight or more, problems such as a decrease in extraction efficiency of the biological substance occur.

In addition, a buffer solution for pH adjustment may be added. Examples of the buffer solution include a Tris-buffer.

3. Method of Manufacturing Magnetic Bead

Next, a method of manufacturing the magnetic bead in the embodiment of the present disclosure will be described.

A method of manufacturing the magnetic bead includes a magnetic metal powder manufacturing step of manufacturing a magnetic metal powder, a classifying step of classifying the magnetic metal powder so as to have a predetermined particle diameter and a predetermined particle diameter distribution, and a step of forming a coating layer on the magnetic metal powder subjected to the classifying step. Hereinafter, the manufacturing method in each of the steps will be described.

3.1. Method of Manufacturing Magnetic Metal Powder

The method of manufacturing the magnetic metal powder is based on a method of manufacturing a general metal powder, and roughly includes any one of a melting process for melting and solidifying a metal to form a powder, a chemical process for manufacturing a powder by a reduction method, a carbonyl method, or the like, and a mechanical process for mechanically pulverizing a larger shape such as an ingot to obtain a powder. Among these, the melting process is most suitable for manufacturing the magnetic metal powder in the embodiment of the present disclosure.

In the manufacturing method based on the melting process, an atomization (spraying) method is exemplified as a representative manufacturing method. In this method, a molten metal having a desired composition and formed by melting is sprayed to obtain a powder.

In the melting step, first, a predetermined amount of a starting material is weighed such that the composition of the magnetic metal powder is a desired composition. The starting material is not particularly limited, and for example, pure Fe is used as the material of Fe, metal silicon or a ferrosilicon alloy is used as the material of Si, and a ferrochrome alloy is used as the material of Cr. The weighed raw materials are heated to a temperature equal to or higher than a melting point in a high-frequency induction melting furnace or the like and melted to obtain a molten metal.

The atomization method is a method in which the molten metal obtained in this manner is rapidly cooled and solidified by colliding with a fluid (liquid or gas) injected at a high speed, followed by pulverization. The atomization method is classified into a water atomization method, a high-pressure water atomization method, a high-speed rotating water atomization method, a gas atomization method, or the like depending on a type of a cooling medium and a configuration of a device. By manufacturing the metal powder by such an atomization method, the magnetic metal powder can be efficiently manufactured. Further, in the high-pressure water atomization method, the high-speed rotating water atomization method, and the gas atomization method, a particle shape of the metal powder is close to a spherical shape due to an action of surface tension. Among these, in the high-pressure water atomization method or the high-speed rotating water atomization method, fine molten metal droplets are formed, and thereafter, the molten metal droplets are rapidly cooled and solidified by a high-speed water stream, so that a rapidly cooled powder close to a spherical shape and having a fine particle diameter can be obtained. In these manufacturing methods, the molten metal can be cooled at an extremely high cooling rate of about $10^{3}$° C./sec to $10^{6}$° C./sec, and therefore, solidification can be achieved with a high degree of disordered atomic arrangement maintained in the molten metal. Therefore, a powder having an amorphous structure can be efficiently manufactured. In addition, by appropriately performing a heat treatment on the obtained amorphous powder, a powder having a nanocrystal structure having a crystal particle diameter of about 100 nm or less can also be obtained.

As a result, the magnetic metal powder having such an amorphous structure or nanocrystal structure is a powder having a small coercive force Hc, and as described above, a magnetic bead having excellent dispersibility can be obtained.

After the magnetic metal powder manufacturing step, a classifying step or a coating step is performed. That is, in the embodiment, regardless of an order of the classifying step and the coating step, after the magnetic metal powder manufacturing step, the coating step may be performed after the classifying step is performed, or conversely, the classifying step may be performed after the coating step is performed.

Therefore, a classification method and a coating method will be described below in this order, and the classifying step is not necessarily performed prior to the coating step.

3.2. Classification Method

The magnetic metal powder or the magnetic bead subjected to the coating step are classified such that a particle diameter and a particle diameter distribution of the finally obtained magnetic bead have desired values or ranges. However, the classification is not necessarily an essential step, and the classification may not be performed when the magnetic bead having the desired particle diameter and particle size distribution is finally obtained without performing the classification.

As the classification method, a method using a sieve, a method using a difference in moving distance due to a centrifugal force in a fluid such as air or water, a method using a difference in settling velocity using the gravity in the same fluid (gravity classification), or the like can be applied.

Classification in a fluid is roughly classified into dry classification (wind classification) in which a classification method is generally performed in a gas such as air, and wet classification in which classification is generally performed in a liquid such as water.

Classification based on a so-called cyclone method, a rotor method, or the like using the difference in moving distance due to the centrifugal force is used in any of the dry classification and the wet classification, and can be applied in any case in the embodiment of the present disclosure. The classification in a liquid is more preferable from the viewpoint of improving the dispersibility of the metal powder or the bead in a fluid and preventing the aggregation of the particles. Examples of a dry classifying device include Aerofine Fine Classifier and Turbo Fine Classifier manufactured by Nisshin Engineering Inc, and examples of a wet classifying device include a slurry screener manufactured by Eurotec Co., Ltd.

When gravity classification is performed in the embodiment of the present disclosure, it is difficult to perform the gravity classification in a gas, and it is preferable to perform the gravity classification in a liquid. In the gravity classification, while it takes time to perform classification, more precise classification can be performed due to a difference in settling time. For example, a powder or a bead having a sharp particle diameter distribution having the D90/D50 of 2 or less can be obtained, and classification can be accurately performed with a minute size having the D50 of several μm or less. As the device, for example, an upright cylindrical wet classifier or the like can be used, and the desired particle diameter and particle diameter distribution can be obtained by obtaining a settling velocity for each particle size (particle diameter) in advance and collecting a powder or a bead from the classifier according to the settling time. In addition, prior to the gravity classification, the dispersion liquid in which the powder or the bead is dispersed may be stirred in advance by a stirring mechanism, and the powder or the bead may be uniformly dispersed in the liquid. The stirring method is not particularly limited, and a stirring mechanism having a blade shape or the like may be used, or ultrasonic waves may be applied.

When the wet classification including the gravity classification is performed, any of water, an aqueous solution, and an organic solvent-based solution can be applied as the dispersion medium. In addition, in order to improve the dispersibility of the metal powder or the bead and to prevent the aggregation of the particles during the classification, a dispersant such as a polycarboxylic acid may be used. Alternatively, a surfactant may be added for the same purpose. However, it is preferable to reduce an amount of addition to such an extent that the function of the metal powder or the bead is not hindered.

Among the wet classification, in the classification method using the difference in moving distance due to the centrifugal force, a powder or a bead is charged into the aqueous-based or organic solvent-based dispersion medium described above to be in a so-called slurry state, and is then charged into a classifier. In this case, the concentration of the powder or the bead in the dispersion medium is not particularly limited, and is preferably 5% by weight to 30% by weight. In an actual classifying step, desired classification is performed by adjusting, as device conditions, a flow rate of a dispersed slurry supplied to a classifying device per unit time and a pressure during charging of the dispersed slurry. In addition, in a method using a rotor, classification is performed while also adjusting a rotor rotation speed.

3.3. Coating Layer Forming Method

The magnetic bead is obtained by forming the coating layer on the surface of the magnetic metal powder. Here, a method of forming the coating layer according to the embodiment of the present disclosure will be described.

The coating layer forming method is not particularly limited as long as it is a method of obtaining an average thickness of the coating layer described above and a material and structure for forming the coating layer described above. Examples of the coating layer forming method include a wet forming method such as a sol-gel method, and a dry forming method such as atomic layer deposition (ALD), chemical vapor deposition (CVD), and ion plating. In addition, a silane coupling treatment and various surface modification treatments for forming the substance such as a protein or the chemical structure described above can also be applied together with these methods.

Among these, when a silicon oxide film suitable for nucleic acid extraction is used as the coating layer, a Stober method, which is a type of sol-gel method, or the above-described ALD method can be mainly used.

The Stober method is a method of forming monodisperse particles by hydrolyzing a metal alkoxide. When the coating layer is made of a silicon oxide, the coating layer can be formed by a hydrolysis reaction of a silicon alkoxide.

Specifically, first, the magnetic metal powder is dispersed in an alcohol solution containing the silicon alkoxide. Examples of the alcohol solution include lower alcohols such as ethanol and methanol. As a ratio of the silicon alkoxide to the alcohol, for example, 10 parts by weight to 50 parts by weight of the alcohol may be mixed with 1 part by weight of tetraethoxysilane. In addition, as a ratio of the magnetic metal powder to the silicon alkoxide, 0.01 parts by weight to 0.1 parts by weight of the silicon alkoxide may be mixed with 1 part by weight of the magnetic metal powder in order to provide a uniform coating film on the particle surface. In addition, examples of the silicon alkoxide include tetramethoxysilane (TMOS), tetraisopropoxysilane, tetrapropoxysilane, tetrakis(trimethylsilyloxy)silane, tetrabutoxysilane, tetraphenoxysilane, and tetrakis(2-ethylhexyloxy) silane. As the silicon alkoxide, tetraethoxysilane (TEOS, $Si(OC_2H_5)_4$) or the like is preferably used.

Next, as a catalyst for promoting a reaction, ammonia water is supplied to cause hydrolysis. Accordingly, a dehydration condensation reaction occurs between hydrolyzates or between the hydrolyzate and the silicon alkoxide, and a bond —Si—O—Si— is formed on the surface of the particles, and therefore, a silicon oxide film is formed.

Before and after the ammonia water is supplied, the magnetic metal powder and the alcohol solution are preferably stirred using an ultrasonic wave applying device or the like. Accordingly, by performing the stirring in each step, it is possible to promote uniform dispersion of the particles and to form the silicon oxide film uniformly on the surface of the particles. The stirring is preferably performed for a period of time longer than a period of time during which the hydrolysis reaction of the silicon alkoxide sufficiently proceeds.

In addition, in the above description, an order in which the magnetic metal powder is dispersed in the alcohol solution containing the silicon alkoxide and then the ammonia water is supplied is set, and the present disclosure is not limited to this order. For example, an order may be set in which the alcohol solution containing the silicon alkoxide may be mixed after the ammonia water is mixed with the alcohol solution in which the magnetic metal powder is dispersed. In such a case, the alcohol solution containing the silicon alkoxide may be added several times. When the alcohol solution containing the silicon alkoxide is added several times, the above-described stirring may be performed every time the alcohol solution is added, or the alcohol solution may be added to the solution under stirring.

As a material having the same effect as that of the ammonia water, triethylamine, triethanolamine, or the like may be used.

In addition, the thickness of the coating layer is influenced by a ratio of the silicon alkoxide in the solution. That is, when the ratio of the silicon alkoxide in the solution is increased, the thickness of the coating layer is increased. When the ratio is excessively increased, the excessive silicon oxide may be formed alone. Therefore, the ratio of the silicon alkoxide in the solution is adjusted such that a desired thickness of the coating layer is obtained.

The magnetic bead according to the embodiment can be manufactured by the above steps, and a heat treatment step may be applied to the obtained magnetic bead in order to further improve the performance. In the heat treatment step, for example, by drying and firing the magnetic bead at 60°

C. to 300° C. for 10 minutes to 300 minutes, a hydrate remaining in the bead can be removed and a strength of the bead can be improved.

The ALD method is also a method suitable for forming a silicon oxide coating film. In a specific silicon oxide coating film forming method based on the ALD method, the magnetic metal powder is charged into a chamber in which vacuum evacuation and atmosphere control can be performed, and at the same time, a substance, which is called a precursor for forming the silicon oxide film, specifically, dimethylamine, methylethylamine, diethylamine, trisdimethylaminosilane, bisdiethylaminosilane, bistertiarybutylaminosilane, or the like is charged into the chamber, and then thermally decomposed to form the silicon oxide on the surface of the magnetic metal powder. According to the ALD method, the coating layer can be formed by deposition at an atomic layer level, and is thus suitable for forming a dense film.

In addition, by selecting the precursor, it is possible to form an oxide layer other than the silicon oxide or a coating layer made of a composite oxide.

4. Method of Manufacturing Magnetic Bead Dispersion Liquid

The magnetic bead dispersion liquid can be manufactured by adjusting components such that the magnetic bead and additives such as a dispersion medium and a surfactant have the configuration described above. The component adjustment is not particularly limited as long as it is performed in a mixing and dispersing step which is widely performed in general. Depending on the biological substance which is the extraction target, it is necessary to devise to prevent contamination of foreign matters that causes a decrease in detection efficiency. For example, in a dispersion liquid in which RNA is an extraction target, a DEPC treatment is performed for the purpose of preventing contamination of RNase. In addition, in other cases, from the viewpoint of preventing contamination of impurities and foreign matters, it is also preferable that the dispersion liquid is manufactured in an environment in which a certain degree of cleanness is maintained, or sterilization is performed as necessary.

5. Biological Substance Extraction Process

A biological substance extraction process by using a magnetic separation method using a magnetic bead dispersion liquid will be described. Here, as described above, the biological substance refers to nucleic acids such as DNA (deoxyribonucleic acid) and RNA, proteins, various cells such as cancer cells, and substances such as peptides and viruses. The nucleic acid may be present in a state of being contained in, for example, a biological sample such as a cell or biological tissue, a virus, or a bacterium.

Figure 2:
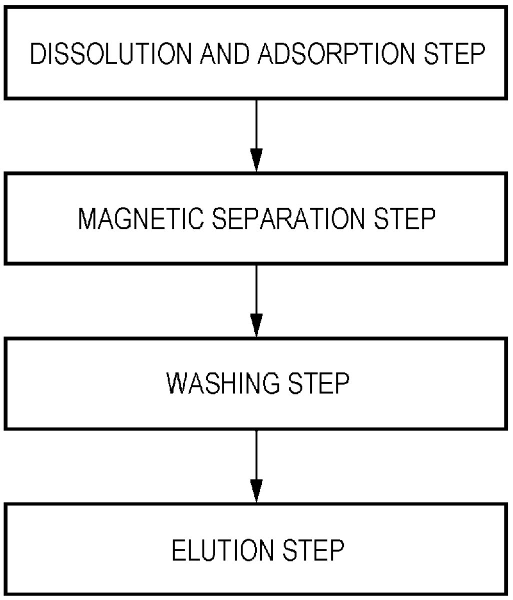
FIG. 2 is a schematic diagram of a biological substance extraction process according to the embodiment.

An outline of the biological substance extraction process by using the magnetic separation method is as shown in FIG. 2, and the biological substance which is an extraction target is extracted through steps including mixing, separation, washing, and elution. A procedure of the extraction process is usually determined for each dispersion liquid or each target biological substance, and is usually clearly indicated by a provider. Such a procedure is generally referred to as an "extraction protocol".

Hereinafter, each step in the extraction process will be described by taking a case where DNA is an extraction target as an example.

5.1. Dissolution and Adsorption Step

In a dissolution and adsorption step, a specimen sample containing DNA (cells, blood, or the like) is charged in a container, and the magnetic bead dispersion liquid and a dissolution and adsorption liquid are mixed in the container. Since DNA is usually encapsulated in a cell membrane or nucleus, first, the DNA is extracted by dissolving and removing a so-called outer shell of the cell membrane or nucleus by a dissolution action of the dissolution and adsorption liquid, and the DNA is adsorbed to the magnetic bead by an adsorption action of the dissolution and adsorption liquid.

Here, as the dissolution and adsorption liquid, for example, a liquid containing a chaotropic substance is used. The chaotropic substance generates chaotropic ions in an aqueous solution, reduces an interaction of water molecules, thereby destabilizing the structure, and contributes to the adsorption of the nucleic acid to the magnetic bead. Examples of the chaotropic substance presenting as the chaotropic ions in the solution include guanidine thiocyanate, guanidine hydrochloride, sodium iodide, potassium iodide, and sodium perchlorate. Among these, guanidine thiocyanate or guanidine hydrochloride having a strong protein denaturation effect is preferably used.

A concentration of the chaotropic substance in the dissolution and adsorption liquid varies depending on the chaotropic substance, and is preferably, for example, 1.0 M or more and 8.0 M or less. In particular, when guanidine thiocyanate is used, the concentration thereof is preferably 3.0 M or more and 5.5 M or less. Further, in particular, when guanidine hydrochloride is used, the concentration thereof is preferably 4.0 M or more and 7.5 M or less.

The dissolution and adsorption liquid may contain a surfactant. The surfactant is used to destroy a cell membrane or cause denaturation of a protein contained in a cell. The surfactant is not particularly limited, and examples thereof include nonionic surfactants such as polyoxyethylene sorbitan monolaurate, Triton-based surfactants, and Tween-based surfactants, and anionic surfactants such as sodium N-lauroyl sarcosine. Among these, the nonionic surfactant is particularly preferable. Accordingly, when the nucleic acid after extraction is analyzed, an influence of an ionic surfactant is prevented. As a result, it is possible to perform analysis by an electrophoresis method and to broaden options for analysis methods.

A concentration of the surfactant in the dissolution and adsorption liquid is not particularly limited, and is preferably 0.1% by mass or more and 2.0% by mass or less.

In addition, the dissolution and adsorption liquid may contain at least one of a reducing agent and a chelating agent. Examples of the reducing agent include 2-mercaptoethanol and dithiothreitol. Examples of the chelating agent include disodium dihydrogen ethylenediaminetetraacetic acid dihydrate (EDTA).

A concentration of the reducing agent in the dissolution and adsorption liquid is not particularly limited and is preferably 0.2 M or less. A concentration of the chelating agent in the dissolution and adsorption liquid is not particularly limited and is preferably 0.2 mM or less.

A pH of the dissolution and adsorption liquid is not particularly limited and is preferably neutral with 6 or more and 8 or less. In addition, in order to adjust the pH, tris(hydroxy)aminomethane, HCl, or the like may be added as a buffer solution.

In the dissolution and adsorption step, contents contained in the container are stirred by a vortex mixer, hand shaking, or the like as necessary. A stirring time is not particularly limited, and may be 5 seconds or longer and 40 minutes or shorter.

5.2. Separation Step (B/F Separation) Based on Magnetic Separation Method

In a magnetic separation step, an external magnetic field is applied on the magnetic bead to which DNA is adsorbed, and the magnetic bead is magnetically attracted. Accordingly, the magnetic bead is moved to and fixed to a wall surface of the container. As a result, the magnetic bead in a solid phase can be separated from a liquid phase.

The separation step is performed as necessary after the dissolution and adsorption step, a washing step, or the like in the entire extraction process.

As described above, since the magnetic bead in the embodiment has high saturation magnetization, the magnetic bead is rapidly moved due to a magnetic field, and is effective in shortening a time of the step. Specifically, in order to apply the external magnetic field to the magnetic bead according to the present disclosure, a time from the installation of the container in a magnetic stand to the end of the movement can be 15 seconds or shorter, and further 5 seconds or shorter. In addition, since the coercive force Hc is in a sufficiently small range, the aggregation of the beads caused by residual magnetization hardly occurs when the external magnetic field is removed, uniform dispersion can be performed, and further, remaining of the liquid between the aggregated beads can be reduced to increase the extraction efficiency.

In the separation step, prior to the magnetic separation, the contents contained in the container are stirred by a vortex mixer, hand shaking, or the like as necessary. Accordingly, a probability that the nucleic acid is adsorbed to the magnetic bead increases.

After the magnetic bead is fixed, an acceleration may be applied to the container as necessary. Accordingly, the liquid adhering to the magnetic bead can be shaken off, so that the solid phase and the liquid phase can be separated from each other more accurately. The acceleration may be a centrifugal acceleration. In order to apply the centrifugal acceleration, a centrifugal separator may be used.

After the magnetic bead and the liquid phase are separated from each other as described above, the liquid phase in the container is discharged by a pipette or the like in a state in which the magnetic bead is fixed to the wall surface of the container.

5.2.1. Magnetic Stand

In the separation step, a magnetic field generator that generates the external magnetic field is used. A configuration or the like of the magnetic field generator is not particularly limited, and unlike a relatively large-scale device such as an electromagnet, a magnetic stand can be used as one of devices that generate a magnetic field in a compact form and efficiently perform the magnetic separation step.

Figure 3:
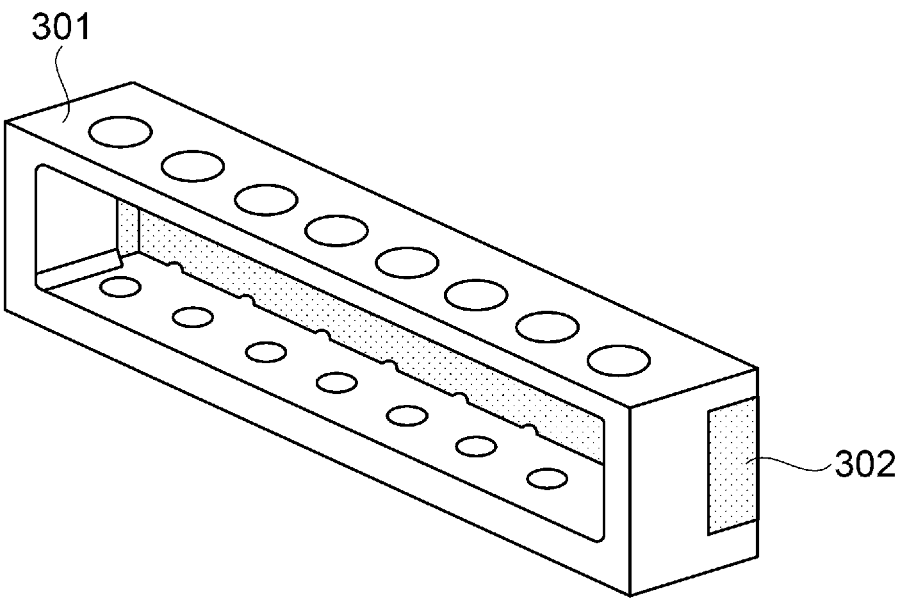
FIG. 3 is a schematic diagram of a magnetic stand according to the embodiment.

FIG. 3 is a schematic view of an example of the magnetic stand. The magnetic stand is in a form that a magnet plate 302 having a plurality of permanent magnet pieces as a magnetic field generation source is disposed on a stand 301 made of a non-magnetic material. In the magnetic separation step, the magnetic stand is a structure in which a container containing the magnetic bead dispersion liquid and various reagents is disposed in the stand, and the magnetic bead is attracted and separated by a magnetic field generated by the plurality of permanent magnet pieces disposed on the magnet plate adjacent to the stand.

As the permanent magnet used in the embodiment, a neodymium iron boron magnet, a samarium-cobalt magnet, a ferrite magnet, an alnico magnet, or the like can be used. A neodymium iron boron sintered magnet is preferably used for being able to generate a sufficient magnetic field by a smaller magnet piece. The neodymium iron boron magnet is preferably used by being subjected to coating such as nickel plating, from the viewpoint of securing reliability over time such as corrosion resistance.

A surface magnetic flux generated from the permanent magnet pieces preferably has a magnetic flux density of 50 mT or more, and more preferably 200 mT or more. As a method of measuring the surface magnetic flux, for example, the surface magnetic flux can be measured by a Gauss meter using a Hall element.

A material of the magnetic stand body is not particularly limited as long as it is non-magnetic as described above. For example, a plastic such as ABS, polypropylene, or nylon, or a metal such as an aluminum alloy is used.

Sizes of the magnetic stand and the permanent magnet pieces are selected according to a size or the like of the container disposed in the magnetic stand. For example, as a container used in a nucleic acid extraction process of DNA or the like, a container called a so-called microtube is generally used, and a container having a capacity of, for example, about 1.5 ml is generally used. On the other hand, in a protein extraction process, a so-called liquid biopsy extraction process, or the like, a container having a larger capacity may be used, and a large magnetic stand and a large permanent magnet piece are applied to such applications.

In the magnetic stand of FIG. 3, a plate-shaped permanent magnet piece is used, and a container is disposed on a side surface of the permanent magnet piece, and a shape of the permanent magnet piece, a positional relationship between the container and the magnet, and the like are not limited to the aspect in this drawing. For example, a case where a container is disposed at a center of an annular magnet, a magnet is disposed on a bottom surface side of the container instead of a side surface of the container, or the like can be selected depending on an application.

5.3. Washing Step

After the liquid phase other than the magnetic bead is removed in the separation step, the washing step is performed. In this step, the magnetic bead to which the nucleic acid is adsorbed is washed. The washing is an operation of removing impurities by bringing the magnetic bead to which the nucleic acid is adsorbed into contact with a washing liquid and then separating the magnetic bead from the washing liquid again in order to remove the impurities adsorbed on the magnetic bead.

Specifically, as described in the separation step, in a state in which the magnetic bead is fixed in the container by the external magnetic field generated by the magnetic field generator, first, the washing liquid is supplied into the container by a pipette or the like. Then, the magnetic bead and the washing liquid are stirred. Accordingly, the washing liquid is brought into contact with the magnetic bead, and the magnetic bead to which the nucleic acid is adsorbed is washed. At this time, the external magnetic field may be temporarily removed. Accordingly, the magnetic bead is dispersed in the washing liquid, so that a washing efficiency can be further improved.

Next, the magnetic bead is fixed again in the container by the external magnetic field, and the washing liquid is discharged. By repeating supply and discharge of the washing liquid as described above one or more times, the magnetic bead can be washed, that is, impurities excluding the nucleic acid, which is the extraction target, can be removed.

The washing liquid is not particularly limited as long as it is a liquid that does not promote elution of the nucleic acid and does not promote binding of impurities to the magnetic bead. Examples of the washing liquid include organic solvents such as ethanol, isopropyl alcohol, and acetone, aqueous solutions of the organic solvents, and a low salt concentration aqueous solution. Examples of the low salt concentration aqueous solution include a buffer solution. A salt concentration in the low salt concentration aqueous solution is preferably 0.1 mM or more and 100 mM or less, and more preferably 1 mM or more and 50 mM or less. A salt for the buffer solution is not particularly limited, and a salt of TRIS, HEPES, PIPES, or phosphoric acid is preferably used.

The washing liquid may contain a surfactant such as Triton (registered trademark), Tween (registered trademark), or SDS. In addition, the washing liquid may contain a chaotropic substance such as guanidine hydrochloride.

A pH of the washing liquid is not particularly limited.

In the washing step, in a state in which the washing liquid is brought into contact with the magnetic bead, the contents contained in the container are stirred by a vortex mixer, hand shaking, or the like as necessary. Accordingly, the washing efficiency can be improved.

The washing step may be performed as necessary, or may be omitted when washing is not necessary.

5.4. Elution Step

In an elution step, the nucleic acid in a carried state is eluted from the magnetic bead. The elution is an operation of transferring the nucleic acid to an eluate by bringing the magnetic bead to which the nucleic acid is adsorbed into contact with an eluate and then separating the magnetic bead from the eluate again.

Specifically, first, the eluate is supplied into the container by a pipette or the like. Then, the magnetic bead and the eluate are stirred. Accordingly, the eluate is brought into contact with the magnetic bead, and the nucleic acid can be eluted. At this time, the external magnetic field may be temporarily removed. Accordingly, the magnetic bead is dispersed in the eluate, so that an elution efficiency can be further improved.

Next, the magnetic bead is fixed again by the external magnetic field, and the eluate from which the nucleic acid is eluted is discharged. Accordingly, the nucleic acid can be recovered.

The eluate is not particularly limited as long as it is a liquid that promotes the elution of the nucleic acid from the magnetic bead to which the nucleic acid is adsorbed. For example, in addition to water such as sterilized water or pure water, a TE buffer solution, that is, an aqueous solution containing a 10 mM Tris-HCl buffer solution and 1 mM EDTA and having a pH of 8 is preferably used.

The eluate may contain a surfactant such as Triton (registered trademark), Tween (registered trademark), or SDS. In addition, the eluate may contain sodium azide as a preservative.

In the elution step, in a state in which the eluate is brought into contact with the magnetic bead to which the nucleic acid is adsorbed, the contents contained in the container are stirred by a vortex mixer, hand shaking, or the like as necessary. Accordingly, the elution efficiency can be improved.

In addition, in the elution step, the eluate may be heated. Accordingly, the elution of the nucleic acid can be promoted. A heating temperature for the eluate is not particularly limited, and is preferably 70° C. or higher and 200° C. or lower, more preferably 80° C. or higher and 150° C. or lower, and still more preferably 95° C. or higher and 125° C. or lower.

Examples of a heating method include a method in which an eluate heated in advance is supplied, and a method in which an unheated eluate is supplied into a container and is then heated. A heating time is not particularly limited, and may be 30 seconds or longer and 10 minutes or shorter.

For example, the elution step may be performed as necessary, and for example, when only the separation of the magnetic bead from the liquid phase in the separation step is the purpose, the elution step may be omitted.

EXAMPLES

Hereinafter, the present disclosure will be described in more detail with reference to Examples, and the present disclosure is not limited to these Examples.

Examples 1 to 5 and Comparative Examples 1 to 4

Magnetic metal powders having various alloy compositions were produced by a high-pressure water atomization method. In the production, a plurality of magnetic metal powders having different particle size distributions were obtained by changing manufacturing conditions and classification conditions during atomization. The magnetic metal powders thus obtained were applied to Examples 1 to 5 and Comparative Examples 1, 2, and 4. Only in Comparative Example 3, a magnetic metal powder obtained by the carbonyl method instead of the high-pressure water atomization method was used.

Thereafter, a film of silicon oxide ($SiO_2$) was formed on a surface of each magnetic metal powder by a Stober method to obtain a magnetic bead. In the Stober method, first, 100 g of a sample of each magnetic metal powder was dispersed and mixed in 950 mL of ethanol, and the mixed solution was stirred for 20 minutes by an ultrasonic wave applying device. After stirring, a mixed solution containing 30 mL of pure water and 180 mL of ammonia water was added, and the mixture was further stirred for 10 minutes. Thereafter, a mixed solution containing tetraethoxysilane (hereinafter referred to as TEOS) and 100 mL of ethanol was further added and stirred, and silicon oxide films having various film thicknesses were each formed on the surface of the magnetic metal powder by adjusting an addition amount of TEOS and a stirring time, thereby producing magnetic beads. Further, the obtained magnetic beads were washed with ethanol and acetone. After the washing, the magnetic beads were dried at 65° C. for 30 minutes, and further fired at 200° C. for 90 minutes.

For each of the obtained magnetic beads, the D50 was measured by the particle size distribution by a laser diffraction method. In addition, the density was measured by a pycnometer, and the coercive force and the saturation magnetization were measured by a vibrating sample magnetometer (VSM). Further, a silicon oxide film thickness (t) was measured by cross-sectional observation.

For each magnetic bead, an alloy composition of the magnetic metal powder (a composition formula is represented by atomic %. The following is the same) and the results obtained by various types of measurement are shown in Table 1.

TABLE 1

| | Alloy composition (atomic %) of magnetic metal powder | D50 (μm) | Density (g/cc) | Coercive force (A/m) | Saturation magnetization (emu/g) | Silicon oxide film thickness t (nm) |
|---|---|---|---|---|---|---|
| Example 1 | $Fe_{72}Si_{14}Cr_2B_{10}C_2$ | 0.7 | 6.44 | 37 | 87 | 15 |
| Example 2 | $Fe_{72}Si_{14}Cr_2B_{10}C_2$ | 3.4 | 6.78 | 29 | 115 | 30 |
| Example 3 | $Fe_{72}Si_{14}Cr_2B_{10}C_2$ | 9.8 | 6.89 | 45 | 109 | 48 |
| Example 4 | $Fe_{72}Si_{14}Cr_2B_{10}C_2$ | 1.1 | 5.87 | 82 | 95 | 48 |
| Example 5 | $Fe_{73.5}Si_{16.7}Al_{9.8}$ | 5 | 6.95 | 325 | 92 | 25 |
| Comparative Example 1 | $Fe_{72}Si_{14}Cr_2B_{10}C_2$ | 0.4 | 4.16 | 72 | 49 | 52 |
| Comparative Example 2 | $Fe_{50}Ni_{50}$ | 3.1 | 7.88 | 1020 | 139 | 28 |
| Comparative Example 3 | $Fe_{100}$ (pure iron) | 11.2 | 7.76 | 835 | 177 | 35 |
| Comparative Example 4 | $Fe_{68.5}Si_{20.7}Al_{10.8}$ | 0.4 | 5.21 | 450 | 48 | 30 |

Each of the magnetic beads shown in Table 1 was dispersed in pure water in an amount of 50% by weight to obtain a magnetic bead dispersion liquid. By using each of the magnetic bead dispersion liquids, DNA was extracted using Hela cells as a specimen based on a biological substance extraction process described in DESCRIPTION OF EMBODIMENTS described above. In the extraction process, first, in the dissolution and adsorption step, an aqueous solution containing guanidine hydrochloride was used as a dissolution and adsorption liquid and added to each magnetic bead dispersion liquid, and this state was held for 10 minutes. In the dissolution and adsorption step, it was visually determined whether settling of each magnetic bead occurred. Thereafter, separation (B/F separation) by a magnetic separation method was performed using the magnetic stand shown in FIG. 3, the washing step and the elution step were performed, and DNA was extracted into an eluate. Hereinafter, the eluate from which DNA was extracted is referred to as a "DNA extract liquid".

The DNA extract liquid obtained from each magnetic bead was subjected to a real-time PCR measurement. The real-time PCR measurement is a method of detecting a target substance (here, DNA) present in a specimen by a polymerase chain reaction, and a Ct (cycle threshold) value used for evaluation of a result represents a numerical value indicating how many times amplification is performed until the target substance reaches a detectable threshold. More specifically, the Ct value is the number of cycles when an amplification product reaches a certain amount and a fluorescence luminance reaches a certain value or more in the PCR measurement. That is, as the Ct value decreases, the extraction efficiency of the test target substance increases, and a test time can be shortened. Therefore, as an amount of DNA in the DNA extract liquid increases, the number of times of amplification for reaching the threshold decreases, and the Ct value is also decreased to a small value.

The results obtained by measuring Ct values of the DNA extract liquids obtained using the magnetic beads shown in Table 1 are shown in Table 2. From Table 2, it can be seen that a low Ct value is obtained in Examples of the present disclosure, and DNA can be efficiently recovered. On the other hand, in Comparative Examples, the improvement of the fluorescence luminance was not found. Therefore, the description in Table 2 is ND. That is, it can be seen that in the magnetic beads of Comparative Examples, a recovery amount of the nucleic acid remained very low due to the occurrence of the settling.

TABLE 2

| Used magnetic bead | Ct value | Presence or absence of settling |
|---|---|---|
| Example 1 | 34 | Absence |
| Example 2 | 26 | Absence |
| Example 3 | 21 | Absence |
| Example 4 | 18 | Absence |
| Example 5 | 28 | Absence |
| Comparative Example 1 | ND | Presence |
| Comparative Example 2 | ND | Presence |
| Comparative Example 3 | ND | Presence |
| Comparative Example 4 | ND | Presence |

What is claimed is:

1. A magnetic bead comprising:

a magnetic metal powder; and a coating layer with which a surface of the magnetic metal powder is coated, wherein D50, which is a 50% particle diameter on a volume basis in a particle size distribution, is 0.5 μm to 10 μm, a density is 5.0 g/cc to 7.5 g/cc, and a coercive force is 800 A/m or less.

2. The magnetic bead according to claim 1, wherein the magnetic metal powder is an alloy containing Fe as a main component.

3. The magnetic bead according to claim 1, wherein saturation magnetization is 50 emu/g or more.

4. The magnetic bead according to claim 1, wherein the magnetic metal powder is an Fe-based metal alloy powder produced by an atomization method.

5. The magnetic bead according to claim 1, wherein the coating layer is made of a silicon oxide (silica), or a composite oxide containing Si and one or two or more selected from the group consisting of Al, Ti, V, Nb, Cr, Mn, Sn, and Zr.

6. A magnetic bead dispersion liquid comprising:

a magnetic bead made of a magnetic metal powder having a coating layer on a surface thereof; and a dispersion medium which is an aqueous solution or an organic solvent containing the magnetic bead, wherein D50, which is a 50% particle diameter on a volume basis in a particle size distribution of the magnetic bead, is 0.5 μm to 10 μm, a density of the magnetic bead is 5.0 g/cc to 7.5 g/cc, and a coercive force of the magnetic bead is 800 A/m or less.

7. A method of manufacturing a magnetic bead dispersion liquid, the method comprising:

manufacturing a magnetic bead by manufacturing a magnetic metal powder;

forming a coating layer on the magnetic metal powder, the magnetic bead having a 50% particle diameter on a volume basis in a particle size distribution of 0.5 μm to 10 μm, a density of 5.0 g/cc to 7.5 g/cc, and a coercive force of 800 A/m or less; and mixing and dispersing the magnetic bead in a dispersion medium which is an aqueous solution or an organic solvent.

* * * * *